(12) United States Patent
Tsuchiya et al.

(10) Patent No.: US 8,128,715 B2
(45) Date of Patent: Mar. 6, 2012

(54) METHOD AND APPARATUS FOR PRODUCING WOUND ELECTRODE ASSEMBLY, AND METHOD FOR PRODUCING BATTERY

(75) Inventors: Kenji Tsuchiya, Toyota (JP); Masataka Takeda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/863,245

(22) PCT Filed: Aug. 20, 2009

(86) PCT No.: PCT/IB2009/006598
§ 371 (c)(1),
(2), (4) Date: Jul. 16, 2010

(87) PCT Pub. No.: WO2010/023525
PCT Pub. Date: Mar. 4, 2010

(65) Prior Publication Data
US 2011/0010928 A1  Jan. 20, 2011

(30) Foreign Application Priority Data
Aug. 28, 2008 (JP) ................. 2008-220392

(51) Int. Cl.
*H01M 4/04* (2006.01)
(52) U.S. Cl. .................... 29/623.5
(58) Field of Classification Search ............ None
See application file for complete search history.

(56) References Cited

U.S. PATENT DOCUMENTS

| 4,365,767 | A |  | 12/1982 | Benthimere |
|---|---|---|---|---|
| 6,045,944 | A | * | 4/2000 | Okada et al. ............ 429/163 |
| 6,536,705 | B1 |  | 3/2003 | Böck |
| 2004/0161663 | A1 |  | 8/2004 | Nishide |

FOREIGN PATENT DOCUMENTS

| EP | 1 741 648 A | 1/2007 |
|---|---|---|
| JP | 2-86535 | 3/1990 |
| JP | 5-132209 | 5/1993 |
| JP | 9-27340 | 1/1997 |
| JP | 10-310299 | 11/1998 |

(Continued)

OTHER PUBLICATIONS

Notification of Reason(s) for Refusal for JP Appl. No. 2008-220392 dated Dec. 16, 2010.

(Continued)

*Primary Examiner* — Robert Hodge
(74) *Attorney, Agent, or Firm* — Finnegan, Henderson, Farabow, Garrett & Dunner, LLP

(57) ABSTRACT

A method for producing a wound electrode assembly includes steps of: overlaying electrode strips (11, 13) and separator strips (12, 14) on each other, and winding the electrode strips (11, 13) and the separator strips (12, 14) on a take-up shaft (20) while pressing a pressing member (30) against the electrode strips and the separator strips. In the winding step, the pressing force of the pressing member (30) is increased with decrease in a tension T applied to at least one of the electrode strips (11, 13) and the separator strips (12, 14).

8 Claims, 9 Drawing Sheets

FOREIGN PATENT DOCUMENTS

| | | | |
|---|---|---|---|
| JP | 10310299 | * | 11/1998 |
| JP | 11-233135 | | 8/1999 |
| JP | 2000-182657 | | 6/2000 |
| JP | 2002-220143 | | 8/2002 |
| JP | 2002-231316 | | 8/2002 |
| JP | 2007-142351 | | 6/2007 |

OTHER PUBLICATIONS

International Search Report in International Application PCT/IB2009/006598, mailed Dec. 28, 2009.

Written Opinion of the International Search Authority in International Application PCT/IB2009/006598, mailed Dec. 28, 2009.

* cited by examiner

METHOD AND APPARATUS FOR PRODUCING WOUND ELECTRODE ASSEMBLY, AND METHOD FOR PRODUCING BATTERY

CROSS-REFERENCE TO RELATED APPLICATIONS

This application is a national phase application of International Application No. PCT/IB2009/006598, filed Aug. 20, 2009, and claims the priority of Japanese Application No. 2008-220392, filed Aug. 28, 2008, the contents of both of which are incorporated herein by reference.

BACKGROUND OF THE INVENTION

1. Field of the Invention

This invention relates to method and apparatus for producing a wound electrode assembly by overlaying and winding electrode strips and separator strips.

2. Description of the Related Art

An example of the method for producing a wound electrode assembly is described in Japanese Patent Application Publication No. 2007-142351 (JP-A-2007-142351). An apparatus disclosed in this publication is arranged to take up elements while pressing a pressure roller (corresponding to a pressing member) against elements (substantially corresponding to electrode strips and separator strips) that are being wound, so as to make the outside diameter and hardness of the wound elements stable or uniform. In this apparatus, while the elements are wound into a roll, the pressure roller is pressed against the elements toward a core of the roll, so as to discharge air trapped in clearances between the elements. However, there is no specific suggestion in JP-A-2007-142351 about how to press the pressure roller against the elements, in particular, how to adjust the pressing force of the pressure roller.

Another conventional example is described in Japanese Patent Application Publication No. 10-310299 (JP-A-10-310299). This publication discloses a method for stably controlling tension of strips (substantially corresponding to electrode strips and separator strips) to be wound up, using a dancer mechanism.

In the meantime, the inventor of the present invention contemplates a method for producing the wound electrode assembly, in which the winding speed is increased so as to improve the production efficiency. For example, the inventor contemplates taking up strip materials having an overall length of about 5 m at a winding speed that exceeds about 2 m/s, so that winding time (i.e., a length of time required to wind up the strip materials) can be significantly reduced. In this case, the winding speed is sharply increased from the beginning of winding, and then sharply reduced before the end of winding. Thus, the winding speed is increased and reduced at a much higher rate than before.

Various problems arise if the winding speed is increased or reduced at such a high rate. For example, if the winding speed is sharply increased from the beginning of winding, the tension applied to the electrode strips and separator strips increases sharply. Also, if the winding speed is sharply reduced before the end of winding, the tension decreases sharply. If the tension decreases sharply, air is likely to be trapped in the wound strip materials, and the wound electrode assembly becomes soft. On the other hand, if the pressing member (pressure roller) is strongly pressed against the electrode strips and separator strips while they are wound, so as to prevent air from being trapped in the wound strip materials, the resulting wound electrode assembly becomes harder than necessary.

SUMMARY OF THE INVENTION

The inventor has developed the present invention in an attempt to provide a wound electrode assembly with appropriate hardness, under the situation where the winding speed is sharply increased or reduced.

A first aspect of the invention relates to a method for producing a wound electrode assembly by overlaying and winding electrode strips and separator strips. The method of production includes a step of winding the electrode strips and the separator strips on a take-up shaft while pressing a pressing member against the electrode strips and the separator strips. In this step, a pressing force of the pressing member is increased with decrease in a tension applied to at least one of the electrode strips and the separator strips. When the tension applied to the electrode strips and/or the separator strips is reduced, the force with which the electrode strips and the separator strips are wound around the take-up shaft is reduced. According to the invention, the pressing force of the pressing member can make up for the reduction in the winding force, and the resulting wound electrode assembly is provided with appropriate hardness.

For example, as the electrode strips and separator strips are wound around the take-up shaft, the outside diameter of a roll of the electrode strips and separator strips that have been wound on the take-up shaft increases. As the outside diameter increases, the force with which the electrode strips and separator strips are wound around the outermost layer of the wound electrode assembly changes. Therefore, the pressing force of the pressing member may be increased with decrease in a division value obtained by dividing the tension by a value corresponding to the outside diameter of the roll of the electrode strips and separator strips that have been wound on the take-up shaft. With this arrangement, the pressing force of the pressing member can be appropriately increased in view of changes in the outside diameter of the wound electrode assembly wound on the take-up shaft.

When each of the electrode strips is formed by coating an electrode material on a continuous sheet over a predetermined electrode width, the pressing force of the pressing member may be increased with decrease in a division value obtained by dividing the tension applied to the electrode strips by a value corresponding to an outside diameter of the roll of the electrode strips and separator strips that have been wound on the take-up shaft and the electrode width. With this arrangement, the pressing force of the pressing member may be appropriately increased in view of the electrode width. Also, the pressing member may be pressed against the electrode strips and separator strips wound on the take-up shaft when the tension applied to the electrode strips and the separator strips is reduced. This method for producing the wound electrode assembly may be used as a method for producing a wound electrode assembly of a battery in which electrode strips and separator strips are overlaid on each other and wound into the electrode assembly.

A second aspect of the invention relates to an apparatus for producing a wound electrode assembly, which includes a take-up shaft that takes up electrode strips and separator strips that are overlaid on each other, a pressing member that is pressed against the electrode strips and separator strips wound on the take-up shaft, a tension detector that detects a tension of the electrode strips or separator strips to be wound on the take-up shaft. The apparatus further includes a controller that controls the pressing member. The controller increases pressing force of the pressing member as the tension detected by the tension detector decreases.

The controller may also set a first reference value for the tension in advance, and may increase the pressing force of the pressing member as a difference between the first reference value and the tension detected by the tension detector increases. When the apparatus includes an outside-diameter detector that detects a value corresponding to an outside diameter of a roll of the electrode strips and separator strips that have been wound on the take-up shaft, the controller can control the pressing force of the pressing member in consideration of the outside diameter of the wound electrode assembly. For example, in this case, the controller may obtain a first division value by dividing the tension detected by the tension detector by the detected value corresponding to the outside diameter of the roll, and may increase the pressing force of the pressing member as a difference between the first division value and a preset second reference value increases.

Also, when each of the electrode strips is formed by coating an electrode material on a continuous sheet over a predetermined electrode width, the electrode width may be taken into consideration. In this case, the tension detector detects the tension applied to the electrode strips. The controller may obtain a second division value by dividing the tension detected by the tension detector by the detected value corresponding to the outside diameter of the wound electrode assembly and the electrode width, and may increase the pressing force of the pressing member as a difference between the second division value and a preset third reference value increases. With this arrangement, the pressing member can be appropriately controlled in view of the electrode width.

Also, the controller may correct the pressing force of the pressing member in accordance with a rate of change of a winding speed at which the take-up shaft takes up the electrode strips and the separator strips. Also, the controller may press the pressing member against the electrode strips and separator strips wound on the take-up shaft when a tension applied to the electrode strips and the separator strips is reduced.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

One example of method for producing a wound electrode assembly according to one embodiment of the invention and one example of apparatus that implements the method of production will be described with reference to the drawings. In the following description, electrode strips and separator strips will be generally called "strip material" when appropriate.

Figure 1:
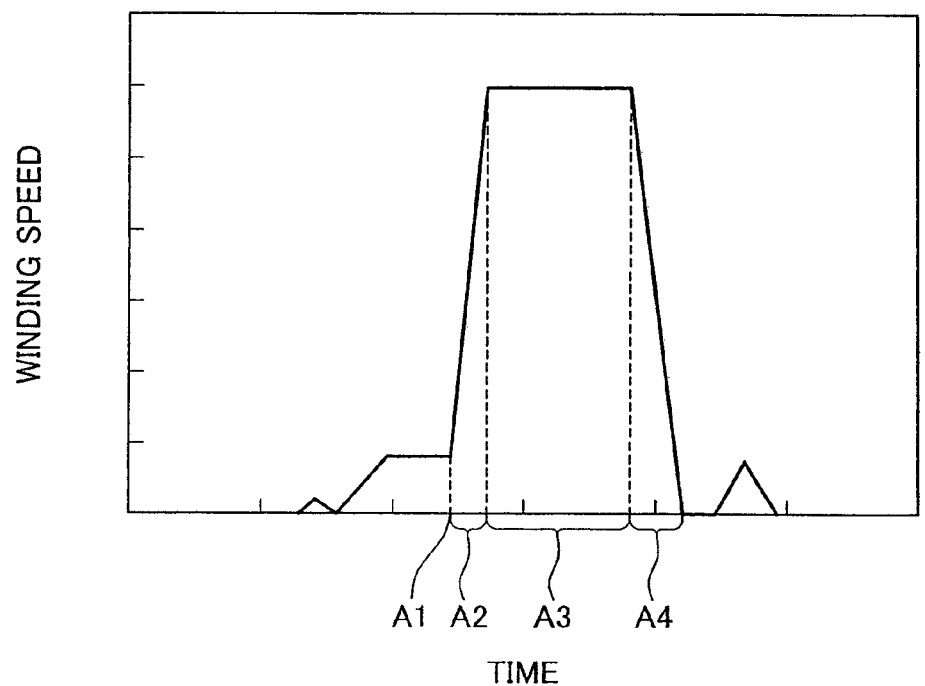
FIG. 1 is a view showing changes in the winding speed during production of a wound electrode assembly.
Figure 2:
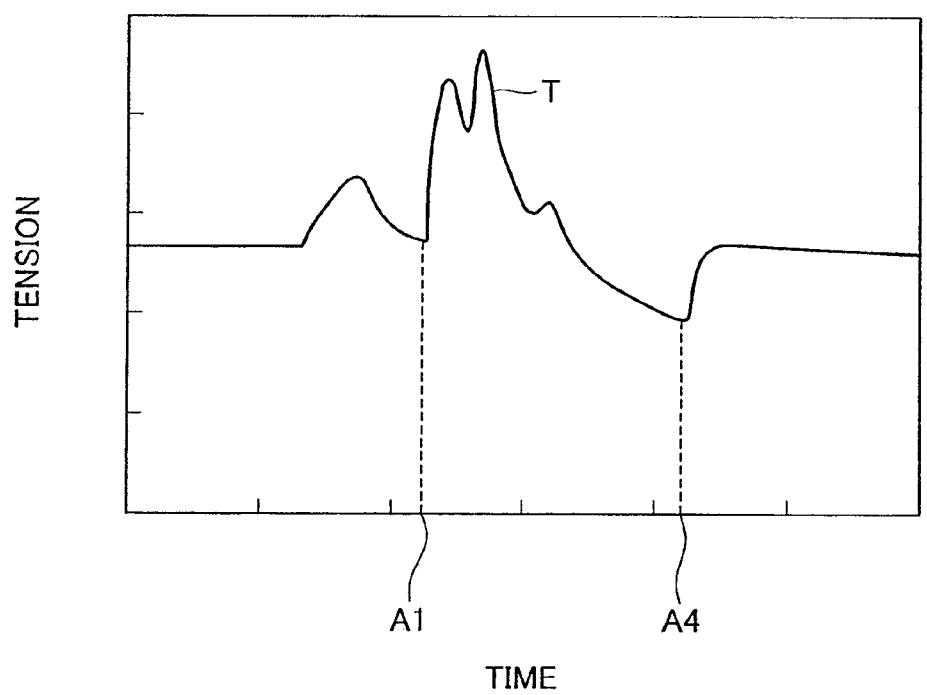
FIG. 2 is a view showing changes in the tension during production of the wound electrode assembly.

In the case where the winding speed is increased so as to shorten winding time (i.e., a length of time required to wind up strip materials), the wound electrode assembly does not provide stable or uniform hardness even when the electrode strips and separator strips are wound while being pressed by a pressing member against a take-up shaft. The inventor of the present invention considers sharp increase and decrease of the winding speed as a cause of the instability in the hardness. More specifically, in order to shorten the winding time, the winding speed is sharply increased (A2) from the beginning of winding (A1), so as to maximize a time period of high-speed winding (A3), as shown in FIG. 1. After the high-speed winding; the winding speed is sharply reduced (A4), and the winding process ends. In this case, sharp increase and decrease in the winding speed occur in the acceleration stage (A2) and deceleration stage (A4), respectively. With the winding speed thus sharply increased and decreased, tension T applied to the electrode strips and separator strips varies sharply and largely, as shown in FIG. 2 by way of example.

Figure 3:
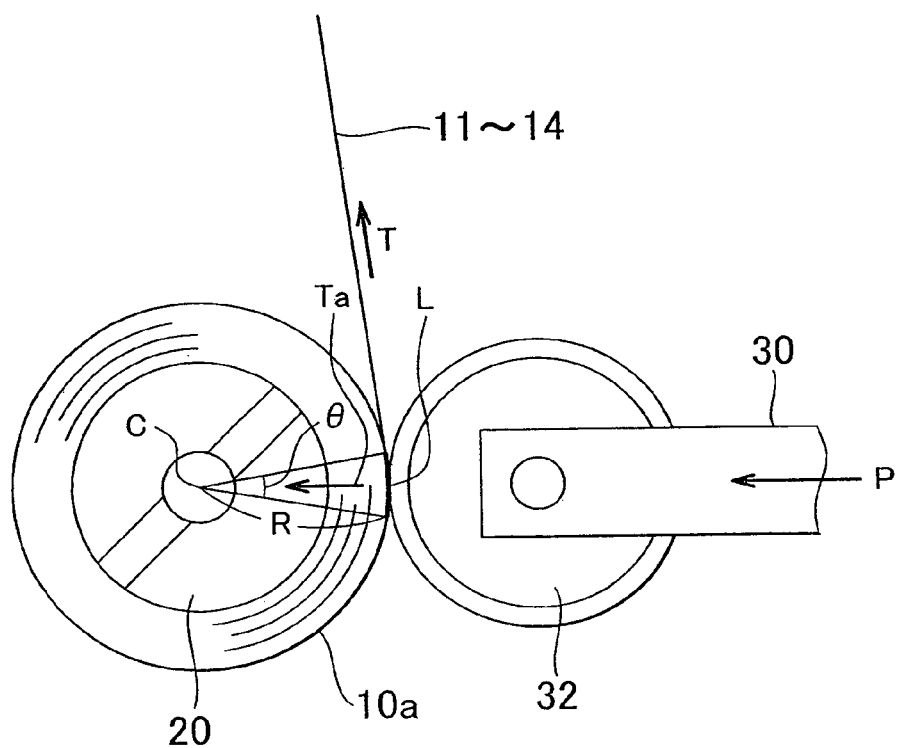
FIG. 3 is a view showing forces applied to strip materials when they are wound on a take-up shaft during production of the wound electrode assembly.
Figure 4:
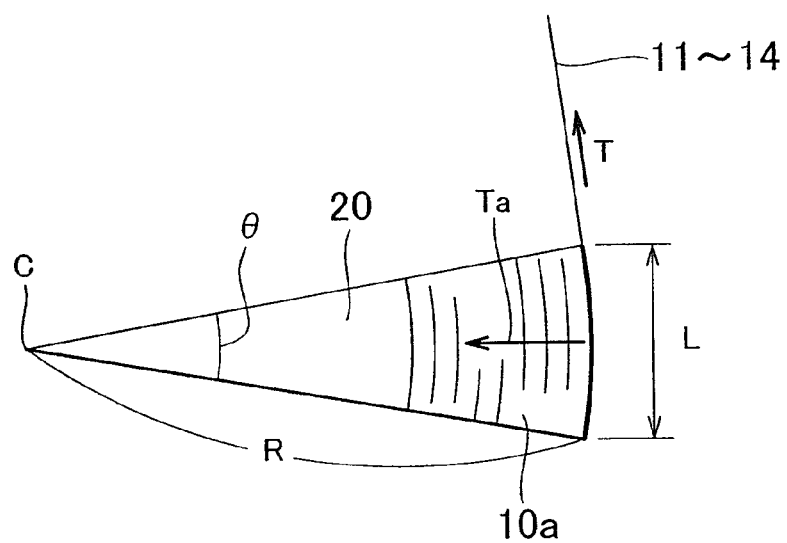
FIG. 4 is a view showing forces applied to strip materials when they are wound on the take-up shaft during production of the wound electrode assembly.

The inventor conducted a further study of the case where strip materials 11-14 are wound while a pressing member 30 is pressed against the strip materials. As a result, the inventor found that force Ta with which the strip materials 11-14 are wound around a take-up shaft 20 is generally equal to the resultant of force arising from the tension T applied to the strip materials 11-14 and force arising from pressing force P of the pressing member 30. The force Ta with which the strip materials 11-14 are wound around the take-up shaft 20 may be regarded as a pressure applied to the wound electrode assembly 10a wound on the take-up shaft 20. If the tension T varies sharply and largely as shown in FIG. 2, the force arising from the tension T, as a part of the force Ta with which the strip materials 11-14 are wound around the take-up shaft 20, varies largely. Therefore, even where the strip materials 11-14 are wound while being pressed by the pressing member 30, as shown in FIG. 3 and FIG. 4, some portions of the strip materials 11-14 are loosely wound around the take-up shaft 20 with reduced force Ta. If the force Ta with which the strip materials 11-14 are wound around the take-up shaft 20 is locally reduced, air may be trapped into a stack of the strip materials 11-14, and the resultant wound electrode assembly may include soft portions where air was trapped. If, on the other hand, the force P with which the pressing member 30 presses the strip materials 11-14 is increased so as to prevent air from being trapped into the stack, the force with which the strip materials 11-14 are wound around the take-up shaft 20 becomes excessively large, resulting in excessive hardness of the wound electrode assembly. Thus, it is difficult to provide the wound electrode assembly with appropriate hardness even where the electrode strips and separator strips are wound while being pressed by the pressing member 30. The present invention has been developed on the basis of the above findings.

In the following, one example of method for producing a wound electrode assembly according to one embodiment of the invention and one example of apparatus that implements the method of production will be described with reference to the drawings.

Figure 5:
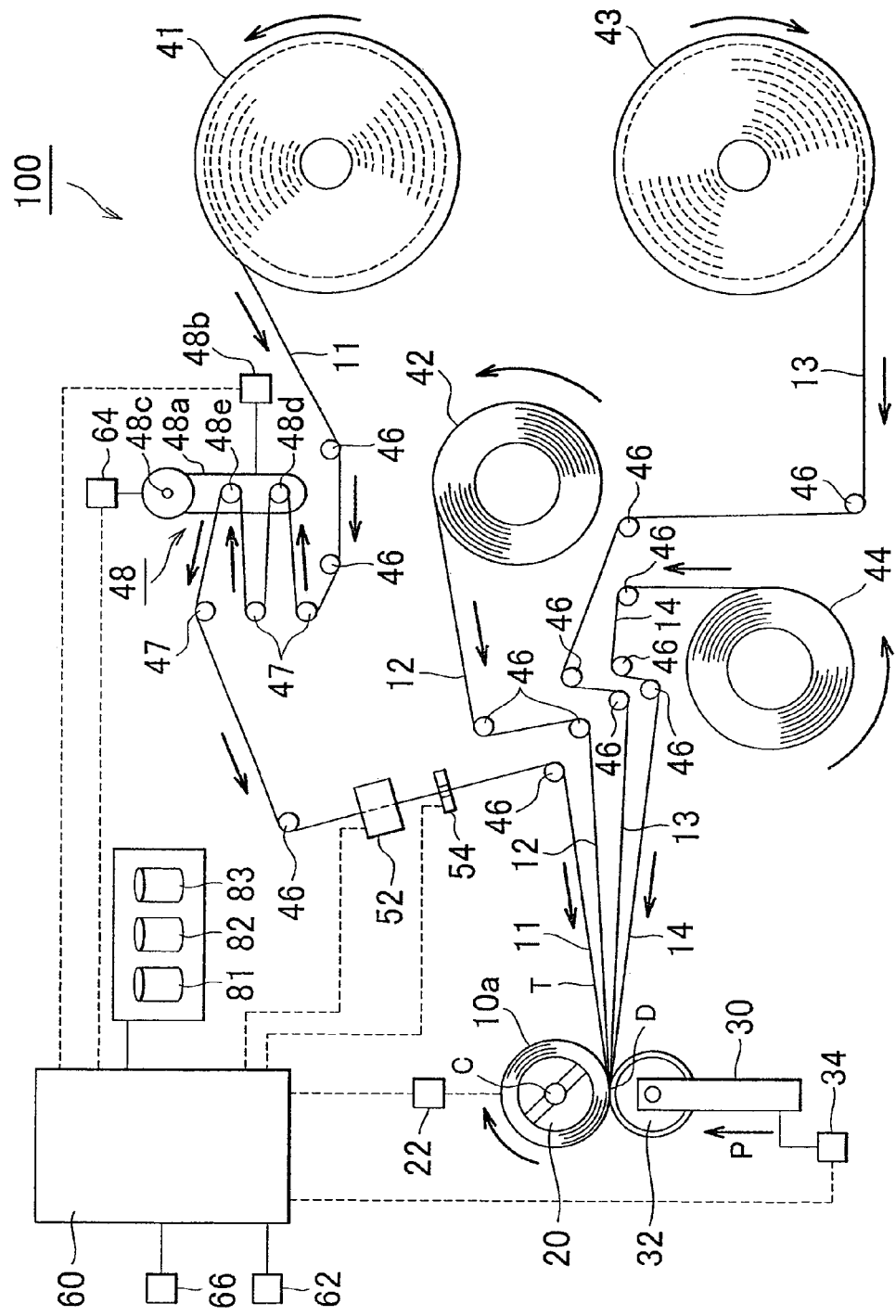
FIG. 5 is a view showing an apparatus for producing a wound electrode assembly according to one embodiment of the invention.

The method of production of this embodiment is a method for producing a wound electrode assembly 10 by overlaying and winding electrode strips 11, 13 and separator strips 12, 14, as shown in FIG. 5. The production method has a process step of winding the electrode strips 11, 13 and the separator strips 12, 14 onto the take-up shaft 20 while pressing the pressing member 30 against the electrode and separator strips 11-14. In this step, the pressing force P of the pressing member 30 is increased as the tension applied to at least one of the electrode strips 11, 13 and the separator strips 12, 14 decreases. If a sharp increase or decrease in the winding speed occurs, the tension T applied to the electrode strips 11, 13 and the separator strips 12, 14 is reduced, as shown in FIG. 2. If the tension T is reduced, the force Ta with which the electrode strips 11, 13 and the separator strips 12, 14 are wound around the take-up shaft 20 is reduced. According to the method of production of this embodiment, the pressing force P of the pressing member 30 is increased with reduction in the tension T. Thus, the pressing force P of the pressing member 30 can make up for a reduction in the above-mentioned force Ta due to the reduction in the tension T. In this manner, the wound electrode body 10 is provided with appropriate hardness.

An apparatus 100 for producing the wound electrode assembly includes, for example, the take-up shaft 20, pressing member 30, supply reels 41-44, guide rollers 46, dancer roller 48, edge detector 52, correcting mechanism 54, and a controller 60, as shown in FIG. 5.

The take-up shaft 20 is a shaft that takes up the electrode strips 11, 13 and the separator strips 12, 14. In this embodiment, the electrode strip 11, separator strip 12, electrode strip 13 and separator strip 14 are overlaid in this order in overlapping fashion, and are wound onto the take-up shaft 20. The take-up shaft 20 is rotated by an actuator 22. The actuator 22 is controlled by the controller 60. The controller 60 includes an operation part comprised of CPU, etc. and a storage part comprised of a non-volatile memory, etc., and performs various electronic computations and control of each portion or component, according to programs set in advance in the storage part. In this embodiment, the controller 60 is configured to detect the rotational speed, the number of revolutions, and winding speed of the take-up shaft 20 and the amount of the strip materials wound on the take-up shaft 20, based on control information of the actuator 22.

The pressing member 30 is pressed against the electrode strips 11, 13 and separator strips 12, 14 that are wound around the take-up shaft 20. In this embodiment, a roller 32 is rotatably mounted on a distal end portion of the pressing member 30. The pressing member 30 is operated by an actuator 34 to be advanced or retracted relative to the take-up shaft 20. Also, in this embodiment, the pressing member 30 is positioned so as to be advanced or retracted in a radial direction of the take-up shaft 20 from position D at which the separator strip 14 as the outermost layer starts being wound, toward the center C of the take-up shaft 20. In this embodiment, the actuator 34 is controlled by the controller 60. In this embodiment, the controller 60 can obtain information on the amount of advancement or retraction and pressing force of the pressing member 30, from control information of the pressing member 30. Furthermore, the controller 60 is provided with an outside-diameter detector 62 for detecting a value corresponding to the outside diameter of the stack of the strip materials wound on the take-up shaft 20, from the information on the amount of advancement or retraction of the pressing member 30.

The electrode strips 11, 13 and separator strips 12, 14 are wound in the form of rolls on the supply reels, 41, 43, 42, 44, respectively. The electrode strips 11, 13 and separator strips 12, 14 are unrolled or drawn from the respective supply reels 41, 43, 42, 44 to the take-up shaft 20. The guide rollers 46 guide the strip materials 11-14, along respective paths along which the strip materials 11-14 are fed to the take-up shaft 20.

Next, the dancer roller 48, edge detector 52 and the correcting mechanism 54 will be explained in this order. These components are provided on each of the paths of the strip materials 11-14 drawn from the respective supply reels 41-44. In FIG. 5, the illustration of the apparatus is simplified in various ways, for the sake of convenience, and the locations of the supply reels 41-44 and the paths of the strip materials 11-14 are different from those of the actual apparatus. It is also to be noted that only the dancer roller 48, edge detector 52 and correcting mechanism 54 provided on the path of the strip material 11 are depicted in FIG. 5, for the sake of convenience, and that these components are also provided on the other paths though not illustrated in FIG. 5.

The dancer roller 48 is a device for adjusting the tension applied to the strip material 11 to be wound. The dancer roller 48 may also be called "tension lever". In this embodiment, the dancer roller 48 includes a rocker shaft 48a and an urging means 48b. The rocker shaft 48a is supported at one end to be rockable or swingable about a pivot 48c. Rollers 48d, 48e are mounted on distal end portion and intermediate portion, respectively, of the rocker shaft 48a. The urging means 48b urges the rocker shaft 48a in a certain rocking direction. In this embodiment, the urging force of the urging means 48b is controlled by the controller 60. By adjusting the urging force, the tension applied to the strip material 11-14 is adjusted.

Figure 6:
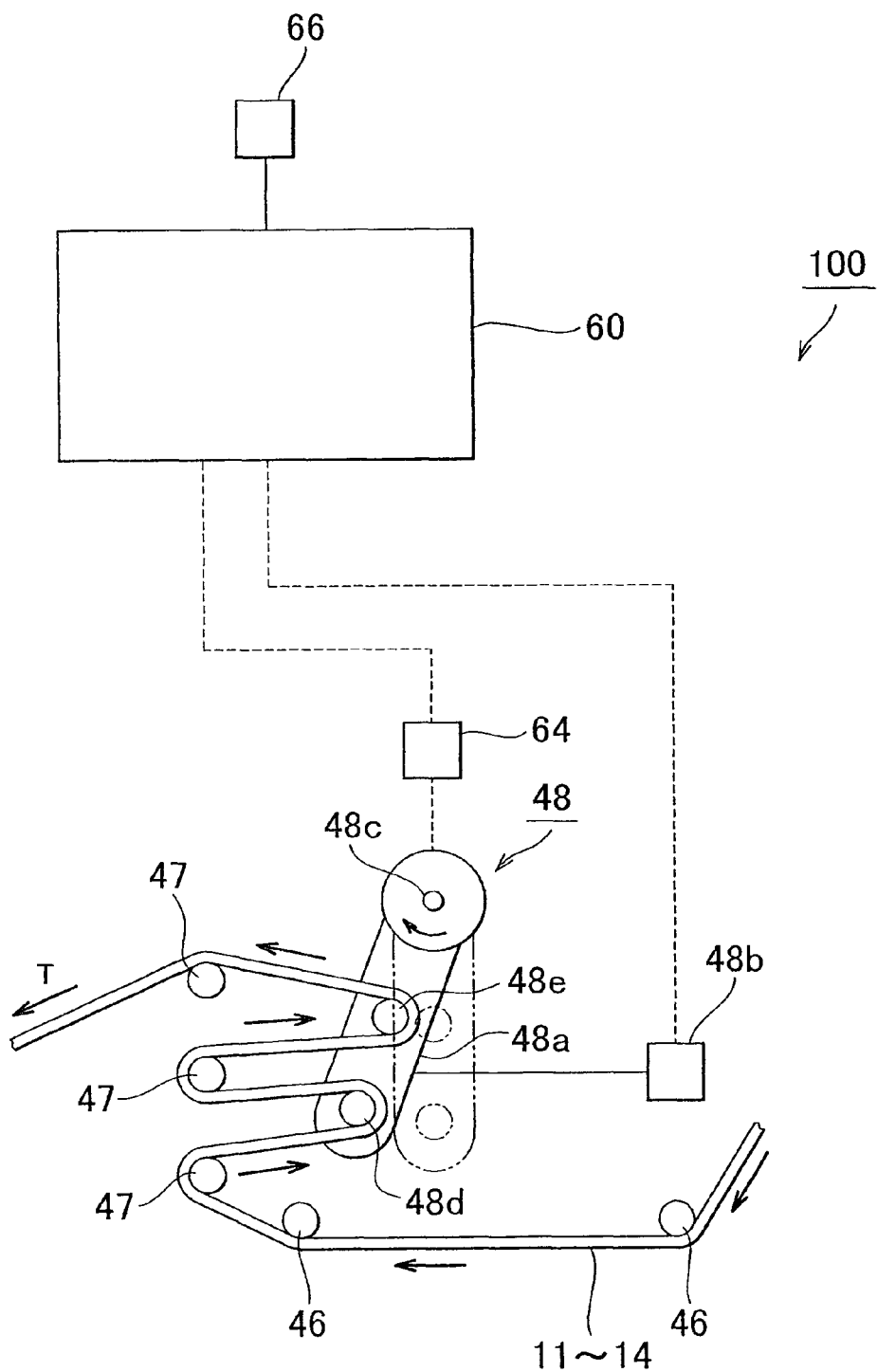
FIG. 6 is a view showing a mechanism for detecting tension in the embodiment of FIG. 5 of the invention.
Figure 7:
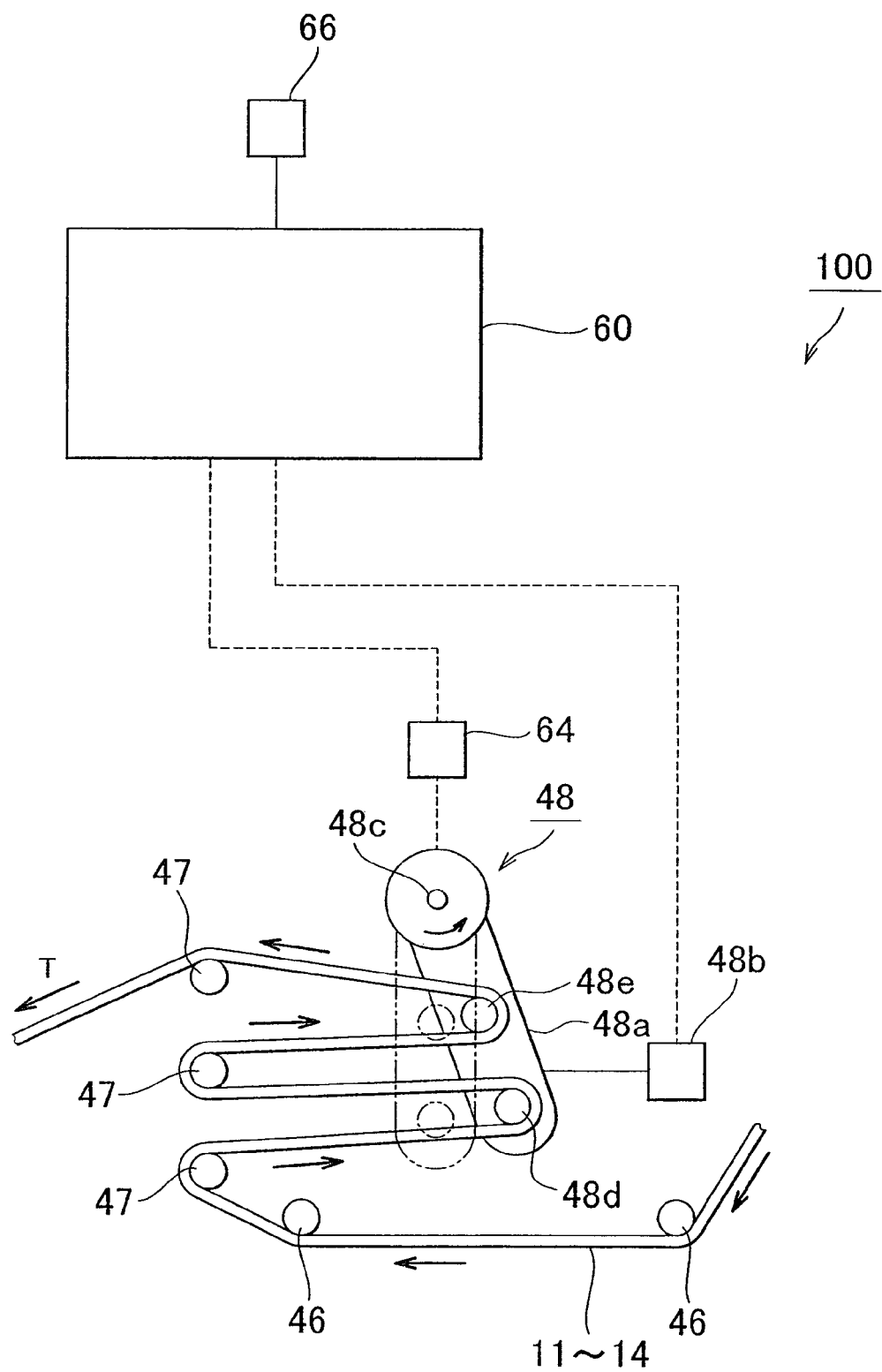
FIG. 7 is a view showing the mechanism for detecting tension in the embodiment of FIG. 5.

The strip materials 11-14 extending from the respective supply reels 41-44 are looped over tension rollers 47 that are fixed in position, and the rollers 48d, 48e of the dancer roller 48, as shown in FIG. 5, though the rollers 47, 48d, 48e for the strip materials 12-14 are not illustrated in FIG. 5. When the tension of the strip material 11-14 and the urging force of the urging means 48b are balanced with each other, the dancer roller 48 is kept at a given rocking angle (neutral position), as shown in FIG. 5. If the tension applied to the strip material 11-14 increases or decreases, the rocker shaft 48a of the dancer roller 48 rocks in accordance with the increase or decrease in the tension, as shown in FIG. 6 and FIG. 7. With the rocker shaft 48a thus rocking or swinging, the dancer roller 48 changes the length of the path of the strip material 11-14, thereby to adjust the tension applied to the strip material 11-14.

The tension applied to the strip material 11 may be determined based on the urging force of the urging means 48b and the amount by which the rocker shaft 48a rocks. In this embodiment, the amount of rocking of the rocker shaft 48a is detected by a first detector 64 mounted on the rocker shaft 48a. The amount or angle by which the rocker shaft 48a rocks may be detected by means of, for example, an encoder or a potentiometer. In this embodiment, the controller 60 is provided with a tension detector 66 for detecting the tension T of the strip material 11-14 to be wound on the take-up shaft 20. The tension detector 66 determines the tension T applied to the strip material 11, based on the urging force detected from control information of the urging means 48b and the rocking amount of the rocker shaft 48a detected by the first detector 64.

The edge detector 52 detects the position(s) of an edge(s) of each strip material 11-14 to be wound on the take-up shaft 20. The correcting mechanism 54 corrects the lateral position (i.e., position as viewed in the direction of the width of the strip) of the strip material 11-14 to be wound on the take-up shaft 20. In this embodiment, the controller 60 controls the correcting mechanism 54 based on a detection signal of the edge detector 52. The strip material 11-14, of which the lateral position is corrected by the correcting mechanism 54, is then wound onto the take-up shaft 20.

In this embodiment, the tension T applied to each of the strip materials 11-14 is adjusted when the strip materials 11-14 are wound, as shown in FIG. 5. By applying appropriate tension to the strip material 11-14, adequate friction can be produced between the guide rollers 46 and the strip material 11-14. With the friction thus applied, the strip material 11-14 is less likely to be displaced in the width direction on the feed path. Also, by adjusting the tension T, the control for correcting the lateral position of the strip material 11-14 can be accomplished with required accuracy. The dancer roller 48 as a mechanism for adjusting the tension T of the strip material 11-14 and the edge detector 52 and correcting mechanism 54 as a mechanism for correcting the lateral position of the strip material 11-14 have been described above. It is to be understood that the mechanism for adjusting the tension of the strip material, the mechanism for correcting the lateral position of the strip material, and specific methods of controlling these mechanisms are not limited to those of the above-described embodiment, but various other constructions, arrangements or methods may be employed according to the invention.

The production apparatus 100 includes the pressing member 30 for pressing the strip materials 11-14 wound on the take-up shaft 20 as described above. Furthermore, the apparatus 100 includes the tension detector 66 that detects or determines the tension T applied to the strip materials 11-14 to be wound on the take-up shaft 20, and the controller 60 that controls the pressing member 30. The controller 60 increases the pressing force P of the pressing member 30 as the tension T detected by the tension detector 66 decreases. Thus, even when the winding speed sharply increases or decreases, causing reduction of the tension T (i.e., loosening of the strip materials 11-14), the pressing force P of the pressing member 30 is increased in accordance with the reduction in the tension T applied to the strip materials 11-14, so as to prevent otherwise possible reduction of the force Ta with which the strip materials 11-14 are wound around the wound electrode assembly 10a (refer to FIG. 3 and FIG. 4). With this arrangement, the wound electrode assembly is provided with appropriate hardness.

There are various control methods for increasing the pressing force P of the pressing member 30 as the tension T detected by the tension detector 66 decreases. For example, the controller 60 detects or determines the tension T applied to the strip materials 11-14 when they are wound onto the take-up shaft 20, as shown in FIG. 5. Then, the pressing force of the pressing member 30 may be increased when a reduction in the tension T is detected.

Figure 8:
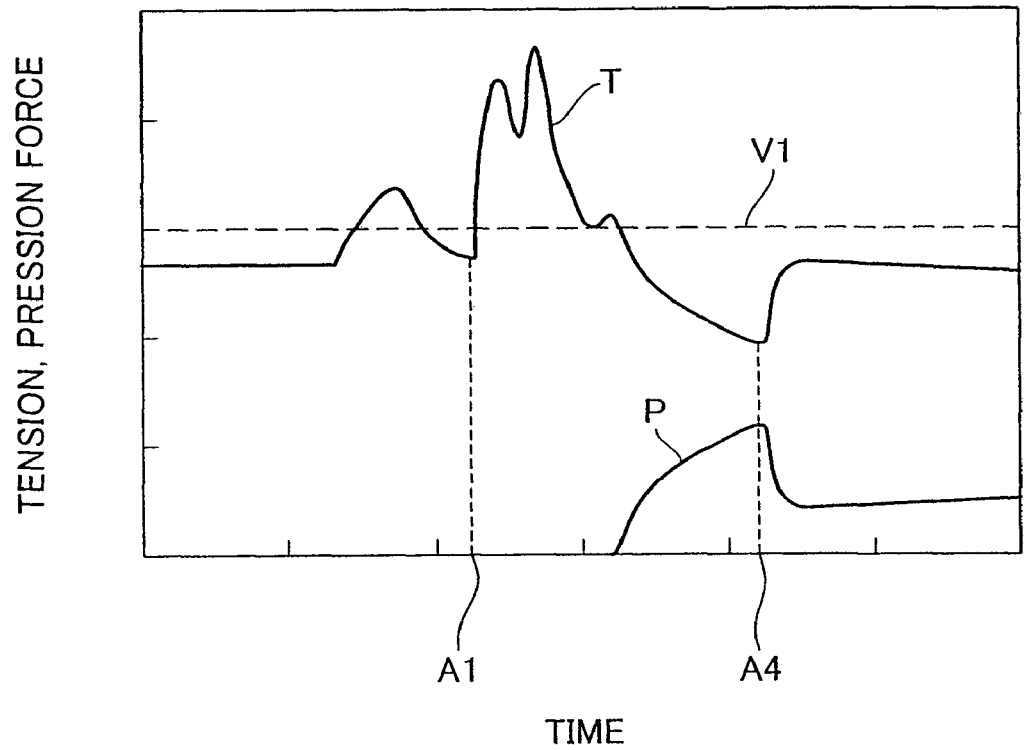
FIG. 8 is a view showing the relationship between changes in the tension and changes in pressing force in the embodiment of FIG. 5.

Another control method will now be described. In the embodiment shown in FIG. 5, the controller 60 sets a reference value V1 for the tension T in a first setting unit 81. The controller 60 increases the pressing force P of the pressing member 30 as a difference (V1−T) between the reference value V1 set in the first setting unit 81 and the tension T detected by the tension detector 66 increases. For example, the tension T applied to the strip materials 11-14 varies greatly from the beginning of winding (A1), as shown in FIG. 2. In this embodiment, a suitable reference value V1 is set with respect to the tension T, as shown in FIG. 8. The controller 60 increases the pressing force P of the pressing member 30 as the difference (V1−T) between the reference value v1 and the tension T increases. In the example shown in FIG. 8, the pressing force P is increased as the tension T decreases to be smaller than the reference value V1. In this manner, the pressing force P of the pressing member 30 can make up for the reduction in the tension T; therefore the strip materials 11-14 can be wound on the take-up shaft 20 with a substantially constant force, and the hardness of the wound electrode assembly can be made more uniform.

The controller 60 controls the take-up shaft 20 and the pressing member 30. In another embodiment of the invention, the controller 60 may correct the pressing force P of the pressing member 30 in accordance with a rate of change of the winding speed at which the take-up shaft 20 takes up the electrode strips 11, 13 and separator strips 12, 14. In this case, the controller 60 may detect a rate of change of the winding speed, calculate variations in the tension T from this information, and obtain an appropriate pressing force P of the pressing member 30. Also, the pressing force P of the pressing member 30 may be controlled according to a predetermined program. Namely, the control of the pressing member 30 may be timed to a program according to which the winding, speed is controlled. In this case, data on the winding speed, the time(s) at which the tension T of the electrode strips 11, 13 and separator strips 12, 14 is reduced, and the amount of reduction of the tension T may be obtained a plurality of times, and the control of the pressing force P of the pressing member 30 may be timed to the control of the winding speed.

The inventor conducted a further detailed analysis of the force Ta with which the strip materials 11-14 are wound around the take-up shaft 20. As shown in FIG. 3 and FIG. 4, the strip materials 11-14 are wound around the outermost layer or periphery of the wound electrode assembly 10a wound on the take-up shaft 20. During the winding process, the hardness of the wound electrode body 10a is substantially determined by the force Ta with which the strip materials 11-14 are wound around the wound electrode assembly 10a, as shown in FIG. 3. In this case, the winding force Ta is substantially determined by the tension T applied to the strip materials 11-14 and the pressing force P of the pressing member 30. The force applied to the strip materials 11-14 due to the tension T, as a part of the winding force Ta, is substantially proportional to the tension T applied to the strip materials 11-14. Furthermore, the force applied due to the tension T acts on an arc L having a certain angle θ formed about the take-up shaft 20, as shown in FIG. 4. Where the radius of the wound electrode body 10a is R, the length of the arc L, which is substantially equal to R·sin θ, is proportional to the outside diameter (or the radius R) of the wound electrode assembly 10a. Accordingly, even where the tension T is constant, the force Ta is influenced by changes in the outside diameter (or radius R) of the wound electrode assembly 10a into which the strip materials 11-14 are wound. In this embodiment, the radius R of the wound electrode body 10a is measured and used as a parameter corresponding to the outside diameter of the wound electrode body 10a. Whether the "value corresponding to the outside diameter of the wound electrode assembly 10a" is the radius R of the wound electrode assembly 10a or the diameter thereof is not an essential matter.

In this case, the pressing force P of the pressing member 30 may be increased as a value (T/R) obtained by dividing the tension T by the value corresponding to the outside diameter of the wound electrode assembly 10a wound on the take-up shaft 20 decreases. In this embodiment, the controller 60 has a second setting unit 82 in which a reference value V2 is set with respect to the value (T/R) obtained by dividing the tension T by the value corresponding to the outside diameter of the wound electrode assembly 10a, as shown in FIG. 5. The controller 60 obtains a first division value (T/R) by dividing the tension T detected by the tension detector 66 by the value corresponding to the outside diameter of the wound electrode assembly 10a detected by the outside-diameter detector 62. Then, the controller 60 obtains a difference (V2−T/R) between the first division value (T/R) and the reference value V2 set in the second setting unit 82. Then, the controller 60 increases the pressing force P of the pressing member 30 as the difference (V2−T/R) increases. In this manner, the pressing force P of the pressing member 30 can be more appropriately controlled, in view of changes in the outside diameter of the wound electrode assembly 10a wound on the take-up shaft 20, so that the final wound electrode assembly 10 is provided with appropriate hardness.

Figure 9:
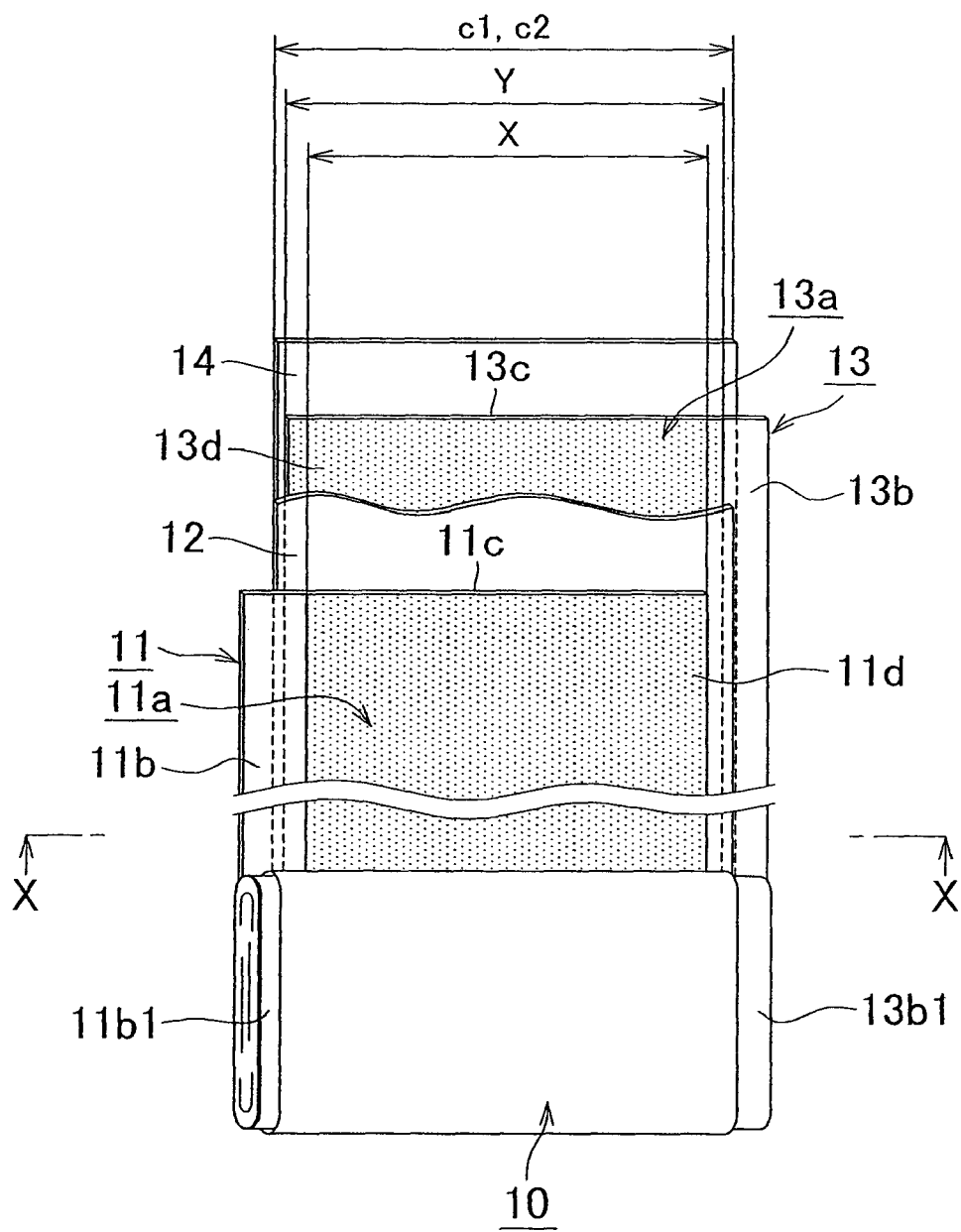
FIG. 9 is a view showing the structure of a wound electrode assembly produced according to one embodiment of the invention.
Figure 10:
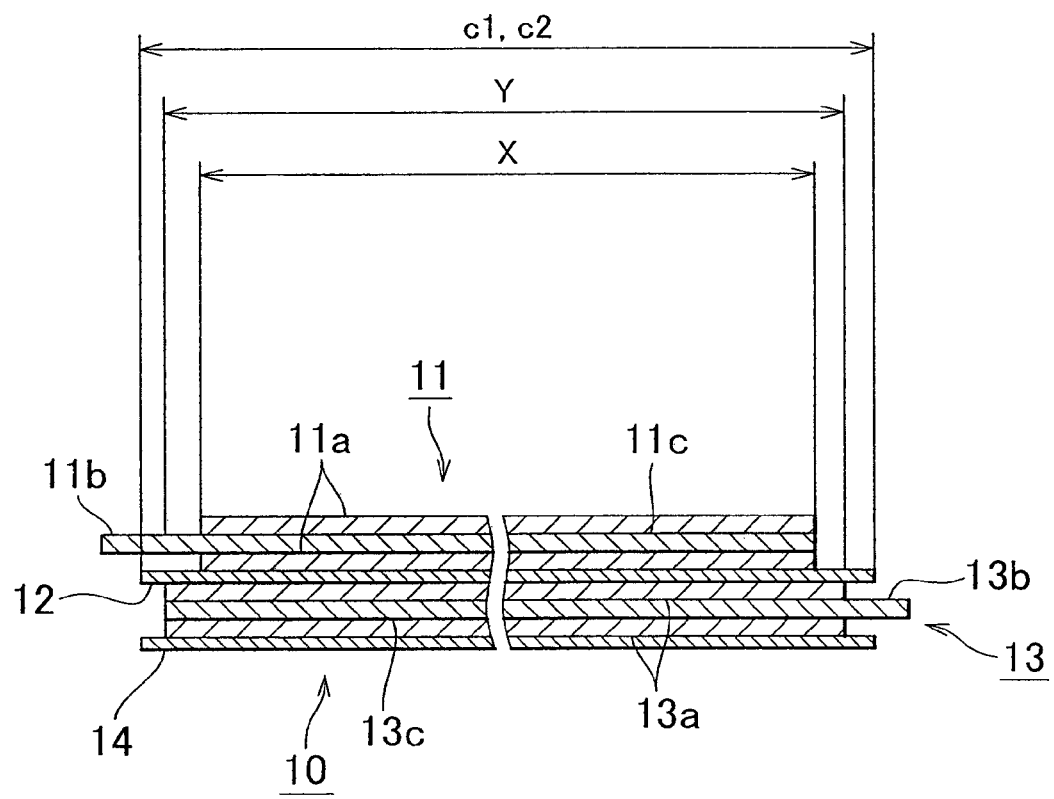
FIG. 10 is a view showing the structure of the wound electrode assembly produced according to the embodiment of the invention.

Next, the wound electrode assembly 10 comprised of the strip materials 11-14 and used as a secondary battery will be considered. In the wound electrode assembly 10, the electrode strips 11, 13 as the strip materials may be formed by coating electrode materials 11d, 13d on continuous sheets or strips over given widths X, Y, as shown in FIG. 9 and FIG. 10 by way of example. In this case, the above-mentioned winding force Ta (see FIG. 3 and FIG. 4) is supposed to act on a portion having the smallest width, and it is therefore desirable to take the widths X, Y (electrode widths) of coatings of the electrode materials 11d, 13d in the electrode strips 11, 13 into consideration. In the example shown in FIG. 9 and FIG. 10, the electrode width X of the electrode strip 11 is slightly smaller than the electrode width Y of the electrode strip 13. In this case, the pressing force of the pressing member 30 is preferably controlled in view of the electrode width X of the narrower electrode strip 11. When the electrode width X of the electrode strip 11 is taken into consideration, the tension of the electrode strip 11 may be regarded as the tension T.

When the electrode width X is taken into consideration, the pressing force P of the pressing member 30 may be increased as a value (T/R/X) obtained by dividing the tension T by the value R corresponding to the outside diameter of the wound electrode assembly 10a wound on the take-up shaft 20 and the electrode width X decreases. In the embodiment shown in FIG. 5, the controller 60 has a third setting unit 83 in which a reference value V3 is set with respect to the value (T/R/X) obtained by dividing the tension T by the value R corresponding to the outside diameter of the wound electrode assembly 10a and the electrode width X. In operation, the controller 60 obtains a second division value (T/R/X) by dividing the tension T by the value R corresponding to the outside diameter of the wound electrode assembly 10a and the electrode width X. Then, the controller 60 obtains a difference (V3−T/R/X) between the second division value (T/R/X) and the reference value V3 set in the third setting unit 83. Then, the controller 60 increases the pressing force P of the pressing member 30 as the difference (V3−T/R/X) increases. In this manner, the pressing force P of the pressing member 30 can be more appropriately controlled in view of the electrode width X, and the wound electrode assembly 10 is provided with appropriate hardness.

In this embodiment, the winding speed is sharply increased from the beginning of winding (A1), as shown in FIG. 1. As a result, the tension T increases sharply, as shown in FIG. 2. When the tension T is sufficiently large, the electrode strips 11, 13 and separator strips 12, 14 may be wound with sufficiently large force Ta even if no force is applied from the pressing member 30, as shown in FIG. 3. Therefore, the pressing member 30 may be arranged to exert pressing force on the wound electrode assembly 10a only when the tension T is reduced.

The controller 60 may be configured to press the pressing member 30 against the electrode strips 11, 13 and separator strips 12, 14 wound on the take-up shaft 20, when the tension T applied to the electrode strips 11, 13 and separator strips 12, 14 is reduced. In this case, the controller 60 may be configured to press the pressing member 30 when the tension T detected by the tension detector 66 becomes smaller than a preset reference value. Also, the controller 60, which controls the take-up shaft 20, may find, in advance, the time at which the tension T applied to the electrode strips 11, 13 and separator strips 12, 14 is reduced, from a control program for controlling the take-up shaft 20. In this case, the pressing member 30 may be pressed against the wound electrode assembly 10a wound on the take-up shaft 20, at the time that the tension T is reduced. Various control methods may be used for pressing the pressing member 30 against the electrode strips 11, 13 and separator strips 12, 14 wound on the take-up shaft 20 when the tension T is reduced.

The wound electrode assembly 10 as described above may be used in various types of secondary batteries, such as a lithium-ion secondary battery and a nickel-hydride secondary battery. In the following, one example of lithium-ion secondary battery will be explained.

Figure 11:
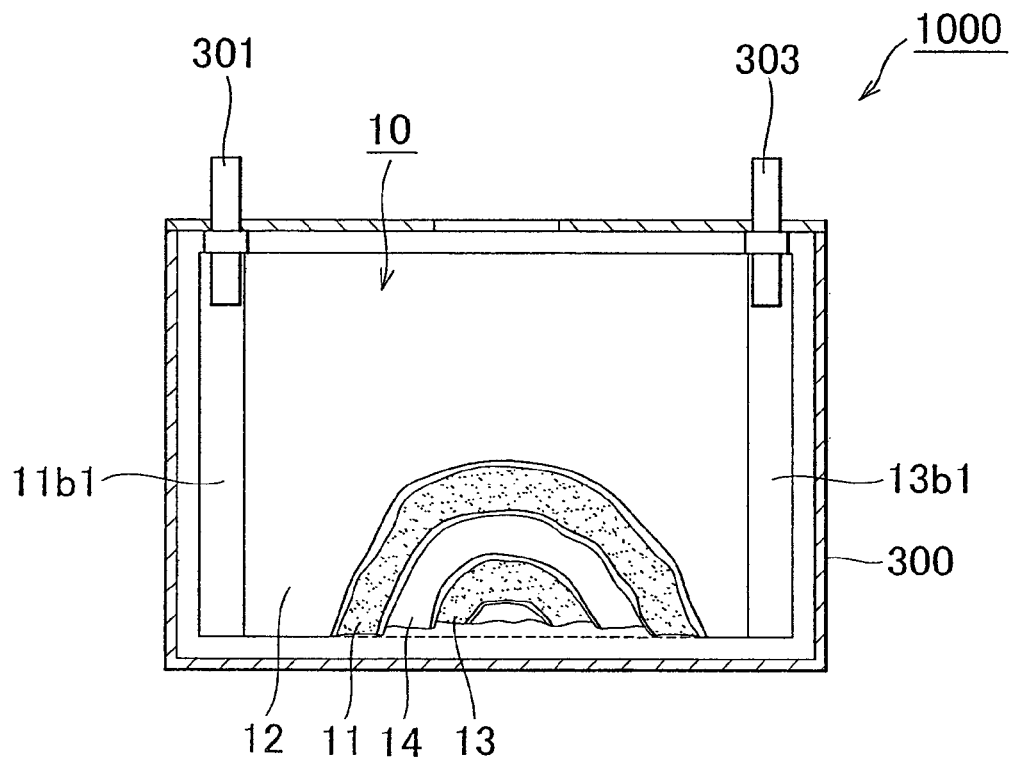
FIG. 11 is a view showing the structure of a secondary battery.

The lithium-ion secondary battery has a rectangular battery case 300 made of metal, as shown in FIG. 11 by way of example, and the wound electrode assembly 10 is housed in the battery case 300. In this embodiment, the wound electrode assembly 10 includes a positive-electrode sheet 11 and a negative-electrode sheet 13 as electrode strips, as shown in FIG. 9 and FIG. 10. The wound electrode assembly 10 also includes a first separator 12 and a second separator 14 as the separator strips 12, 14. The positive-electrode sheet 11, first separator 12, negative-electrode sheet 13 and the second separator 14 are overlaid in this order, and wound up.

To form the positive-electrode sheet 11 in this embodiment, the electrode material 11d containing a positive-electrode active material is applied by coating onto opposite surfaces of a current collector sheet 11c (positive-electrode collector) formed of an aluminum foil. The positive-electrode active material contained in the electrode material 11d may be selected from, for example, lithium manganate ($LiMn_2O_4$), lithium cobalt oxide ($LiCoO_2$), and lithium nickel dioxide ($LiNiO_2$). To form the negative-electrode sheet 13 in this embodiment, the electrode material 13d containing a negative-electrode active material is applied by coating onto opposite surfaces of a current collector sheet 13c (negative-electrode collector) formed of a copper foil. The negative-electrode active material contained in the electrode material 13d may be selected from, for example, carbon-base materials, such as graphite and amorphous carbon, oxides of transition metals containing lithium, nitrides of transition metals, and so forth. The separators 12, 14 are in the form of films through which ionic materials can permeate. In this embodiment, microporous films made of polypropylene are used as the separators 12, 14.

In this embodiment, each of the electrode materials 11d, 13d is coated on one side of the corresponding current collector sheet 11c, 13c as viewed in the width direction, and an edge portion of the collector sheet 11c, 13c opposite to the above-indicated one side as viewed in the width direction is not coated with the electrode material. Portions of the positive-electrode and negative-electrode sheets 11, 13 where the electrode materials 11d, 13d are coated on the current collector sheets 11c, 13c will be called "coated portions 11a, 13a", and portions of the electrode sheets 11, 13 where the electrode materials 11d, 13d are not coated on the current collector sheets 11c, 13c will be called "non-coated portions 11b, 13b".

FIG. 10 is a cross-sectional view taken in the width direction, which shows a condition in which the positive-electrode sheet 11, first separator 12, negative-electrode sheet 13 and the second separator 14 are overlaid in this order in overlapping fashion. The coated portion 11a of the positive-electrode sheet 11 and the coated portion 13a of the negative-electrode sheet 13 are opposed to each other with the separators 12, 14 interposed therebetween. As shown in FIG. 9 and FIG. 10, the non-coated portions 11b, 13b of the positive-electrode sheet 11 and negative-electrode sheet 13 protrude from the separators 12, 14 at the opposite sides of the wound electrode assembly 10 as viewed in the direction perpendicular to the winding direction (i.e. the axial direction of the take-up shaft). The non-coated portions 11b, 13b of the positive-electrode sheet 11 and negative-electrode sheet 13 respectively form current collectors 11b1, 13b1 for the positive electrode and negative electrode of the wound electrode assembly 10.

In the lithium-ion secondary battery as described above, lithium ions move between the coated portion 11a of the positive-electrode sheet 11 and the coated portion 13a of the negative-electrode sheet 13 through the separator strips 12, 14, upon charge and discharge of the battery. The coated portion 11a of the positive-electrode sheet 11 is formed so as not to protrude from the coated portion 13a of the negative-electrode sheet 13, so that lithium ions are prevented from precipitating upon charge and discharge of the battery. In this embodiment, the width (electrode width X) of the coated portion 11a of the positive-electrode sheet 11 is made smaller than the width (electrode width Y) of the coated portion 13a of the negative-electrode sheet 13, as shown in FIG. 9 and FIG. 10. Also, the coated portion 11a of the positive-electrode sheet 11 and the coated portion 13a of the negative-electrode sheet 13 are formed so as not to protrude from the separators 12, 14, thereby to prevent a short circuit from occurring within the battery.

However, errors may occur during manufacture of the battery, and the positive-electrode sheet 11, separator 12, negative-electrode sheet 13 and the separator 14 may be displaced from their normal positions in the lateral or width direction when they are overlaid on each other. In order to accommodate the errors and displacements, suitable values (distances) are set to a difference (Y−X) between the width Y of the coated portion 13a of the negative-electrode sheet 13 and the width X of the coated portion 11a of the positive-electrode sheet 11, and a difference ((c1, c2)−Y) between the width c1, c2 of the first separator 12 and second separator 14 and the width Y of the coated portion 13a of the negative-electrode sheet 13.

According to the method for producing the wound electrode assembly of this embodiment, the wound electrode assembly 10 can be formed with appropriate hardness, as described above. Also, displacements of the wound strip materials during production of the wound electrode assembly 10 can be reduced. Therefore, the above-mentioned difference (Y−X) and difference ((c1, c2)−Y) may be reduced.

Also, the wound electrode assembly 10 is housed in the battery case 300, as shown in FIG. 11. The wound electrode assembly 10 is bent into a generally flat shape when it is placed in the battery case 300. In this embodiment, appropriate hardness is given to the wound electrode assembly 10; therefore, the hardness of the wound electrode assembly 10 may be adjusted so that the electrode assembly 10 is easily bent, and is stably held in the shape into which the electrode assembly 10 is bent.

The battery case 300 is provided with a positive-electrode terminal 301 and a negative-electrode terminal 303. The positive-electrode terminal 301 is electrically connected to the positive-electrode collector 11b1 (see FIG. 9) of the wound electrode assembly 10. The negative-electrode terminal 303 is electrically connected to the negative-electrode collector 13b1 (see FIG. 9) of the wound electrode assembly 10. A liquid electrolyte is injected into the battery case 300. The liquid electrolyte may consist of a non-aqueous electrolyte like a mixed solvent, such as diethyl carbonate or ethylene carbonate, which contains a suitable amount of a suitable electrolyte salt (for example, a lithium salt, such as $LiPF_6$). Since the wound electrode assembly 10 is formed with appropriate hardness as described above, the wound electrode body 10 is adequately impregnated with the liquid electrolyte. If the hardness of the wound electrode assembly 10 varies from portion to portion, the wound electrode assembly 10 is likely to locally deteriorate, causing reduction in the service life of the secondary battery. According to this embodiment, variations in the hardness of the wound electrode assembly 10 can be reduced, thus assuring increased service life of the secondary battery.

Figure 12:
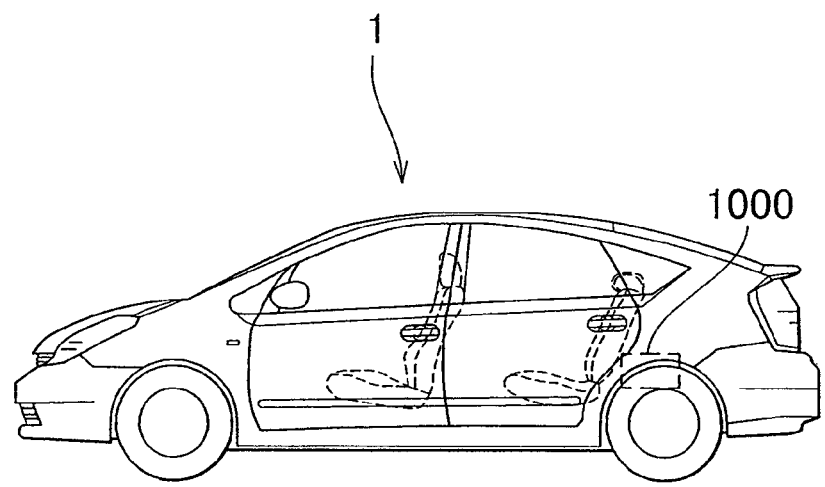
FIG. 12 is a view showing a vehicle on which the secondary battery is installed as a power source.

A plurality of such lithium-ion secondary batteries as described above are combined together to provide a battery assembly 1000, which may be installed as a power source on a vehicle 1, as shown in FIG. 12. The present invention contributes to improvement in the stability of the battery performance and increase in the service life of the battery. Thus, the present invention is useful as a method for producing wound electrode assemblies used in the battery assembly installed as a power source on the vehicle 1. Also, the method of production of this embodiment is useful as a method for producing a wound electrode assembly in which electrode strips and separator strips are overlaid on each other and wound up. Thus, the method of production of this embodiment is a preferable method for producing wound electrode assemblies for use in various types of batteries having wound electrode assemblies.

While the method for producing the wound electrode assembly according to one embodiment of the invention and the apparatus for producing the same have been described above, the invention is not limited to the illustrated embodiment. For example, the wound electrode assembly is not limited to the above-described one that constitutes the lithium-ion secondary battery, but the invention may be applied to various types of wound electrode assemblies. With regard to the apparatus for producing the wound electrode assembly, the take-up shaft, pressing member, dancer roller, edge detector, correcting mechanism, and other components are not particularly limited to those of the illustrated embodiment. For example, while the value corresponding to the outside diameter of the wound electrode assembly wound on the take-up shaft is determined based on the amount of advancement or retraction of the pressing member in the illustrated embodiment, the manner of detecting or determining the value is not limited to this. For example, the value corresponding to the outside diameter of the wound electrode assembly may be calculated based on the rotational speed of the take-up shaft and the thicknesses of the strip materials 11-14. While the tension applied to the strip material 11-14 is detected through the dancer roller in the illustrated embodiment, the manner of detecting the tension is not limited to this. For example, tension detection rollers capable of detecting the tension may be provided on the paths of the strip materials 11-14, and the tension may be detected by means of the rollers. Also, according to the method of the illustrated embodiment, the pressing force of the pressing member is controlled based on the tension applied to the electrode strips, out of the electrode strips and the separator strips. However, the tension based on which the pressing force is controlled is not necessarily the tension applied to the electrode strips, but the pressing force of the pressing member may be controlled based on the tension applied to the separator strips, out of the electrode strips and the separator strips. However, the tension applied to the electrode strips is often higher than the tension applied to the separator strips when the electrode strips and separator strips are wound. In this case, the tension applied to the electrode strips has a greater influence on the force with which the strip materials are wound, and therefore, the pressing force of the pressing member is preferably controlled based on the tension applied to the electrode strips.

The invention claimed is:

1. A method for producing a wound electrode assembly, comprising:
conveying electrode strips and separator strips to a space between a take-up shaft and a pressing member while maintaining the electrode strips and the separator strips separate from one another until the electrode strips and the separator strips pass into the space between the take-up shaft and the pressing member;
overlaying the electrode strips and the separator strips and winding the electrode strips and the separator strips on the take-up shaft while pressing the pressing member against the electrode strips and the separator strips;
detecting a tension of at least one of the electrode strips and the separator strips; and
increasing a pressing force of the pressing member as the detected tension of the at least one of the electrode strips and the separator strips decreases.

2. The method according to claim 1, wherein the pressing force of the pressing member is increased with decrease in a division value obtained by dividing the tension by a value corresponding to an outside diameter of a roll of the electrode strips and separator strips that have been wound on the take-up shaft.

3. The method according to claim 1, wherein the tension applied to said at least one of the electrode strips and the separator strips is a tension applied to the electrode strips.

4. The method according to claim 1, wherein:
each of the electrode strips is formed by coating an electrode material on a continuous sheet over a predetermined electrode width; and
the pressing force of the pressing member is increased with decrease in a value obtained by dividing the tension applied to the electrode strips by a value corresponding to an outside diameter of a roll of the electrode strips and separator strips that have been wound on the take-up shaft and the electrode width.

5. The method according to claim 1, wherein:
each of the electrode strips is formed by coating an electrode material on a continuous sheet over a predetermined electrode width; and
the pressing force of the pressing member is increased with decrease in a value obtained by dividing the tension applied to the electrode strips by a value corresponding to an outside diameter of a roll of the electrode strips that have been wound on the take-up shaft and an electrode width that is a smaller one of electrode widths of a positive electrode and a negative electrode.

6. The method according to claim 1, wherein the pressing member is pressed against the electrode strips and separator strips wound on the take-up shaft only when the tension applied to the electrode strips and the separator strips decreases.

7. A method for producing a battery, wherein the method comprises forming a wound electrode assembly of the battery, and wherein the forming of the wound electrode assembly of the battery comprises:
conveying electrode strips and separator strips to a space between a take-up shaft and a pressing member while maintaining the electrode strips and the separator strips separate from one another until the electrode strips and the separator strips pass into the space between the take-up shaft and the pressing member;
overlaying the electrode strips and the separator strips and winding the electrode strips and the separator strips on the take-up shaft while pressing the pressing member against the electrode strips and the separator strips;
detecting a tension of at least one of the electrode strips and the separator strips; and
increasing a pressing force of the pressing member as the detected tension detected of the at least one of the electrode strips and the separator strips decreases.

8. The method according to claim 7, wherein:
the wound electrode assembly is pressed into a generally flat shape, and is placed in a battery case into which a liquid electrolyte is injected; and
electrode terminals provided on the battery case are connected to current collectors of the electrode strips when the wound electrode assembly is placed in the battery case.

* * * * *